United States Patent
Sur et al.

(10) Patent No.: US 11,941,722 B2
(45) Date of Patent: Mar. 26, 2024

(54) KERNEL OPTIMIZATION AND DELAYED EXECUTION

(71) Applicant: Mellanox Technologies, Ltd, Yokneam (IL)

(72) Inventors: Sayantan Sur, Morrisville, NC (US); Stephen Anthony Bernard Jones, San Francisco, CA (US); Shahaf Shuler, Kibbutz Lohamei Hagetaot (IL)

(73) Assignee: Mellanox Technologies, Ltd., Yokneam (IL)

( * ) Notice: Subject to any disclaimer, the term of this patent is extended or adjusted under 35 U.S.C. 154(b) by 272 days.

(21) Appl. No.: 17/450,743

(22) Filed: Oct. 13, 2021

(65) Prior Publication Data

US 2023/0112420 A1    Apr. 13, 2023

(51) Int. Cl.
*G06T 1/20* (2006.01)
*G06F 9/54* (2006.01)

(52) U.S. Cl.
CPC ............... *G06T 1/20* (2013.01); *G06F 9/545* (2013.01)

(58) Field of Classification Search
CPC ... G06T 1/20; G06F 9/545; G06F 2209/5018; G06F 9/5027; G06F 9/5016; G06F 2209/509
See application file for complete search history.

(56) References Cited

U.S. PATENT DOCUMENTS

| | | | |
|---|---|---|---|
| 9,602,437 B1 * | 3/2017 | Bernath | H04L 49/9084 |
| 2009/0307699 A1 * | 12/2009 | Munshi | G06F 9/44 |
| | | | 718/102 |
| 2018/0375841 A1 * | 12/2018 | Tola | H04L 63/0227 |
| 2020/0151127 A1 * | 5/2020 | Amento | H04L 69/324 |
| 2021/0304350 A1 * | 9/2021 | Kalele | G06T 1/60 |
| 2022/0092199 A1 * | 3/2022 | Jiang | G06F 21/6209 |
| 2022/0292626 A1 * | 9/2022 | Agostini | G06T 1/60 |

OTHER PUBLICATIONS

Levi et al., U.S. Appl. No. 17/983,427, filed Nov. 9, 2022.
Wasko et al., U.S. Appl. No. 17/988,812, filed Nov. 17, 2022.
IEEE Std. 1588-2008, "IEEE Standard for a Precision Clock Synchronization Protocol for Networked Measurement and Control Systems," The IEEE Instrumentation and Measurement Society, pp. 1-289, Jul. 24, 2008.
Li et al., "Sundial: Fault-tolerant Clock Synchronization for Datacenters", 14th USENIX Symposium on Operating Systems Design and Implementation, USENIX Association, pp. 1171-1186, Nov. 2020. https://www.usenix.org/conference/osdi20/presentation/li-yuliang.

* cited by examiner

*Primary Examiner* — Said Broome
*Assistant Examiner* — Donna J. Ricks
(74) *Attorney, Agent, or Firm* — Lowenstein Sandler LLP

(57) ABSTRACT

A kernel comprising at least one dynamically configurable parameter is submitted by a processor. The kernel is to be executed at a later time. Data is received after the kernel has been submitted. The at least one dynamically configurable parameter of the kernel is updated based on the data. The kernel having the at least one updated dynamically configurable parameter is executed after the at least one dynamically configurable parameter has been updated.

20 Claims, 8 Drawing Sheets

KERNEL OPTIMIZATION AND DELAYED EXECUTION

TECHNICAL FIELD

At least one embodiment pertains to kernel optimization and execution according to various novel techniques described herein. For example, prior to execution of a previously submitted kernel on a graphics processing unit, an agent may modify kernel parameters of the kernel on the graphics processing unit according to various novel techniques described herein.

BACKGROUND

Optimization of a kernel requires understanding of the needs of an application associated with the kernel and the information (e.g., data) on which the kernel will operate. Data can originate from within a computer system or from outside of the computer system (e.g., from a remove computer system via a network). Generally the data to be used for a kernel should be known prior to submission of the kernel to a processor for execution. If the data is already known at the time of kernel submission to a processor (e.g., a graphics processing unit (GPU)), then that kernel can be optimized for execution according to the already known data. However, in some instances the data to be used in the kernel is not known at the time of kernel submission. For example, in some instances the data can be received by a network interface after a kernel is submitted, in which case it may not be possible to select optimized parameters for execution of the kernel at the time of kernel submission. This can result in inefficient kernels where either too many resources have been committed to the kernel or too few resources have been committed to the kernel. Alternatively, an application may wait until the data is received before submitting the kernel, which introduces a delay in submission and execution of the kernel.

DETAILED DESCRIPTION

Figure 1A:
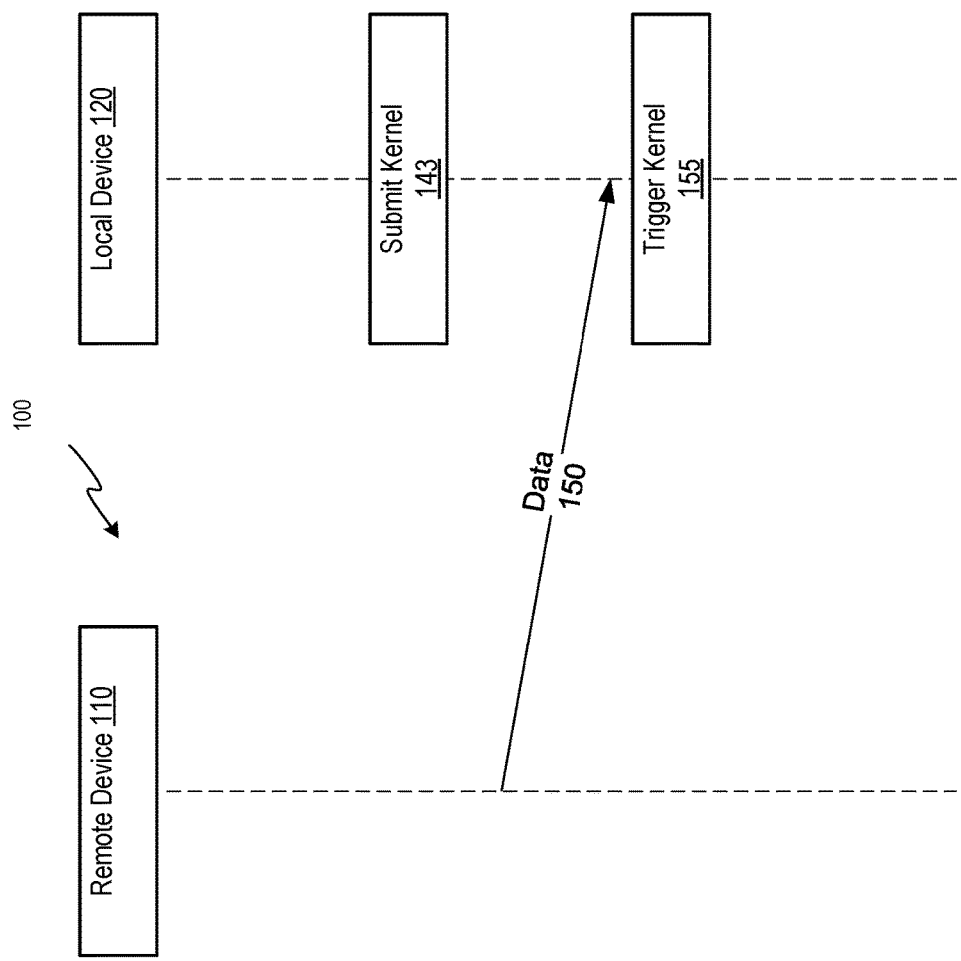
FIG. 1A-C illustrates an example an example scenario for kernel submission and execution.

Embodiments described herein relate to optimization of compute kernels via delayed kernel configuration and/or execution. In embodiments, processing logic (e.g., an application) may submit a kernel into a work queue of a processor (e.g., a central processing unit (CPU) or accelerator) before information is known about the data that the kernel will process. Additionally, or alternatively, the kernel may be submitted into the work queue before processing logic can determine which specific kernel will be used. In such an embodiment, the kernel submission may be for a generic kernel that includes a parameter that can later be filled in to specify which specific kernel is to be executed. Once the data to be processed by the kernel is known, one or more parameters of the kernel can be updated and the kernel can be executed. Examples of such parameters include a memory allocation, a number of threads to use, an execution duration, an identifier of which kernel to use, and so on. This enables the kernel to be placed into a work queue early, and then updated and processed as data becomes available, increasing an efficiency of kernel submission and execution while also ensuring optimal configuration of the kernel.

In embodiments, when the kernel is submitted, a flag is set on the kernel indicating that it is to be executed later, referred to as a wait-to-execute flag. The wait-to-execute flag may have a first assigned memory location. Additionally, one or more parameters of the kernel that are to be updated may be assigned one or more additional memory locations. The first assigned memory location and/or one or more additional assigned memory locations may be reported to an agent, which may run on a device that will receive the data usable to determine the kernel parameters. The agent may be, for example, a network agent on a network interface card (NIC). Once the agent receives the data and/or metadata describing the data (e.g., a header of a message), the agent may determine the optimized parameters for the kernel and then update the submitted kernel to have those optimized parameters. The agent may write to the additional memory locations of the one or more parameters of the kernel, for example, to update those one or more parameters. Additionally, the agent may update the wait-to-execute flag once the data is received to indicate that the kernel is ready to be executed. By managing the set-up and submission of the kernel by a processor and offloading the updating of the kernel to an agent that is in-line with data that will be used by the kernel, the updating and execution of the kernel can be dynamically optimized in a manner that frees up processor resources and eliminates or minimizes any back-and-forth communication between the processor and the device receiving the data (e.g., NIC) after the data is received. In embodiments, a running kernel can be optimized dynamically without a network hardware and/or software stack taking on full responsibility of kernel submission since the task of kernel submission is performed by a host processor (e.g., host CPU). There are many complexities associated with kernel submission related to security, driver interaction (e.g., between a CPU and a GPU driver), operating system (OS) interaction, and so on. Such complexities are already generally solved as they pertain to kernel submission handled by a host processor. Accordingly, by having the host processor handle kernel submission, these complexities do not have to be addressed for the separate device that receives the data (e.g., network hardware/software stack).

In at least one embodiment, a compute kernel (e.g., kernel) includes a routine or function compiled for execution on one or more processors (e.g., for high throughput accelerators, such as graphics processing units (GPUs), digital signal processors (DSPs), or field-programmable gate arrays (FPGAs)). In at least one embodiment, compute kernels may be separate from, but used by, a main program or application, which may run on the same or different processor or processors (accelerators and/or on one or more central processing units (CPUs)) than those that execute the kernels. In at least one embodiment, a compute kernel may be a Compute Unified Device Architecture (CUDA) kernel, a DirectCompute kernel, an OpenMP kernel, an OpenCL kernel, an SYCL kernel, or other type of kernel. In at least one embodiment, a compute kernel is a kernel for execution on a processor, which may be a CPU or general purpose processing device, or an accelerator (e.g., GPU, DSP, FPGA) or special purpose processing device.

In some instances, an application may submit a compute kernel to be executed on a processing device (e.g., GPU or CPU) once information is known about the requirements of the compute kernel. Requirements of the compute kernel can be a data size, data type, number of threads, amount of memory, type of kernel, and/or any other suitable information usable to select and optimize an appropriate compute kernel. For example, data size determines the amount of computation to be performed by the compute kernel, which may correlate to a number processing threads that would be optimal to complete processing of the data within a certain time period. Depending on the application, the data size may be dynamic, and the size of the data may not be known until the data is received (e.g., over a network). As described above, the application may submit compute kernels to be performed on the processing device based on data received from the network. Properties of the data received from the network are typically not ascertainable at the time of submission of the compute kernel by the application.

In some instances, an application running on a device (e.g., on a host processor of a device) can attempt to anticipate properties of data to be received at a later time (e.g., from a network) and submit a kernel with default parameters prior to arrival of the data at the device. This may result in underutilization or overutilization of processor resources based on the actual data received not matching the kernel with the anticipated default parameters. Additionally, in extreme cases, the kernel may not be used at all due to some or all of the requirements of the kernel not matching the data received.

FIG. 1A is a sequence diagram illustrating an example scenario for kernel submission and execution in which a kernel is submitted using kernel parameters that are estimated. In some instances, a local device 120 may execute an application that uses data received from a remote device 110 over a network. The data received from the remote device 110 may be used for execution of one or more kernels on one or more processors (e.g., such as a CPU and/or GPU) of the local device 120. The local device 120 and the remote device 110 may optionally establish a round trip communication in which a message request is transmitted prior to an associated message that includes data to be processed. In one example, remote device 110 may send an initial message (e.g., a message request) to local device 120. The initial message might optionally include some information regarding expected properties of the data to be sent to the local device 120 to provide the local device 120 with some knowledge about the data to be received. However, the information may be an estimate, and may not be accurate. In some embodiments, the information includes a maximum possible size of the data to be sent. At block 143, the local device 120 submits a kernel to a processor. However, at this point the local device 120 may not have sufficient information to accurately determine the parameters for the kernel, such as memory allocation, number of threads, kernel type, and so on. Accordingly, the local device 120 may make an educated guess as to what parameters to use for the kernel. Local device 120 may submit the kernel (block 143) using the estimated kernel parameters.

After submission of the kernel, local device 120 may or may not send a message (e.g., a kernel ready message) to the remote device at block 145. Remote device 110 may then send a message header and/or data to the local device 120 at block 150. Responsive to receiving the data, local device 120 may trigger the kernel at block 155. The kernel may then be executed using the kernel parameters that were set at block 143. However, the kernel parameters that were used for the kernel may not be optimal.

One data property that is a factor to consider for kernel parameters is data length or size. The length or size of data (e.g., of an incoming message) may correspond to an amount of computation to be performed. For example, if a large amount of data is to be processed, then use of many threads may be optimal to finish computation within a given deadline. Conversely, if the amount of data to be processed is small, then use of one or a few threads may be optimal. However, in many use cases the size of incoming messages (e.g., data) is dynamic and cannot be statically predetermined.

Figure 1C:
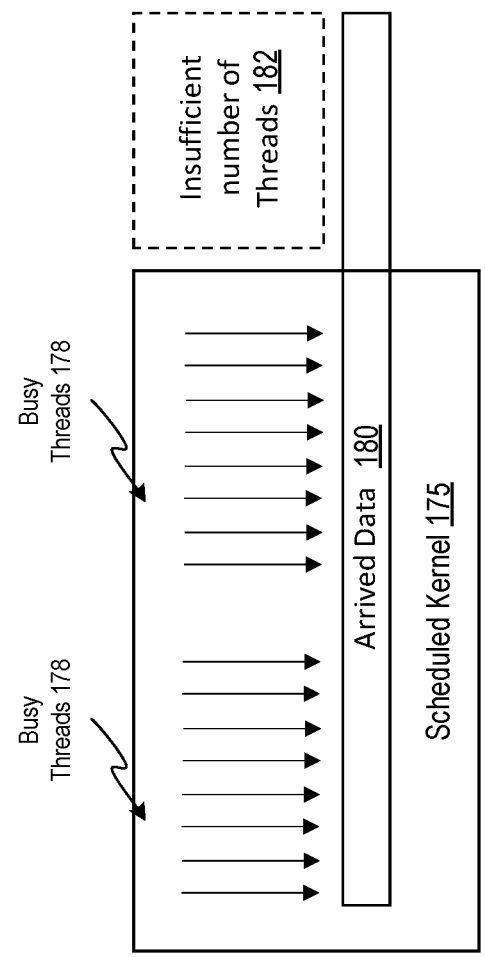
Figure 1B:
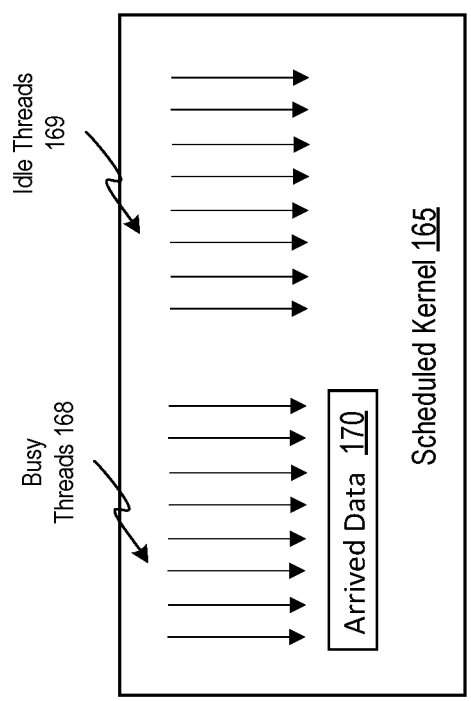

FIGS. 1B-C illustrate two examples of kernels having inefficient kernel parameters. FIG. 1B shows a scheduled kernel 165 for which too many threads were allocated. As shown, a first set of threads (busy threads 168) processes arrived data 170. However, an additional set of threads (idle threads 169) were also allocated for the scheduled kernel 165. Accordingly, idle threads 169 are unused by the scheduled kernel 165 because busy threads 168 are sufficient to process the arrived data 170, and are unused by other kernels or functions because they are allocated for scheduled kernel 165

FIG. 1C shows a scheduled kernel 175 for which not enough threads were allocated. As shown, a set of threads (busy threads 178) processes arrived data 180. However, arrived data is too large to process within a target time frame using the allocated busy threads 178. Accordingly an insufficient number of threads 182 was allocated, and additional threads should have been allocated for the scheduled kernel 175. As a result, In some instances, a device may wait until all relevant information (e.g., data size, data type, etc.) about data to be processed is known before submitting a kernel for processing that data.

Figure 2:
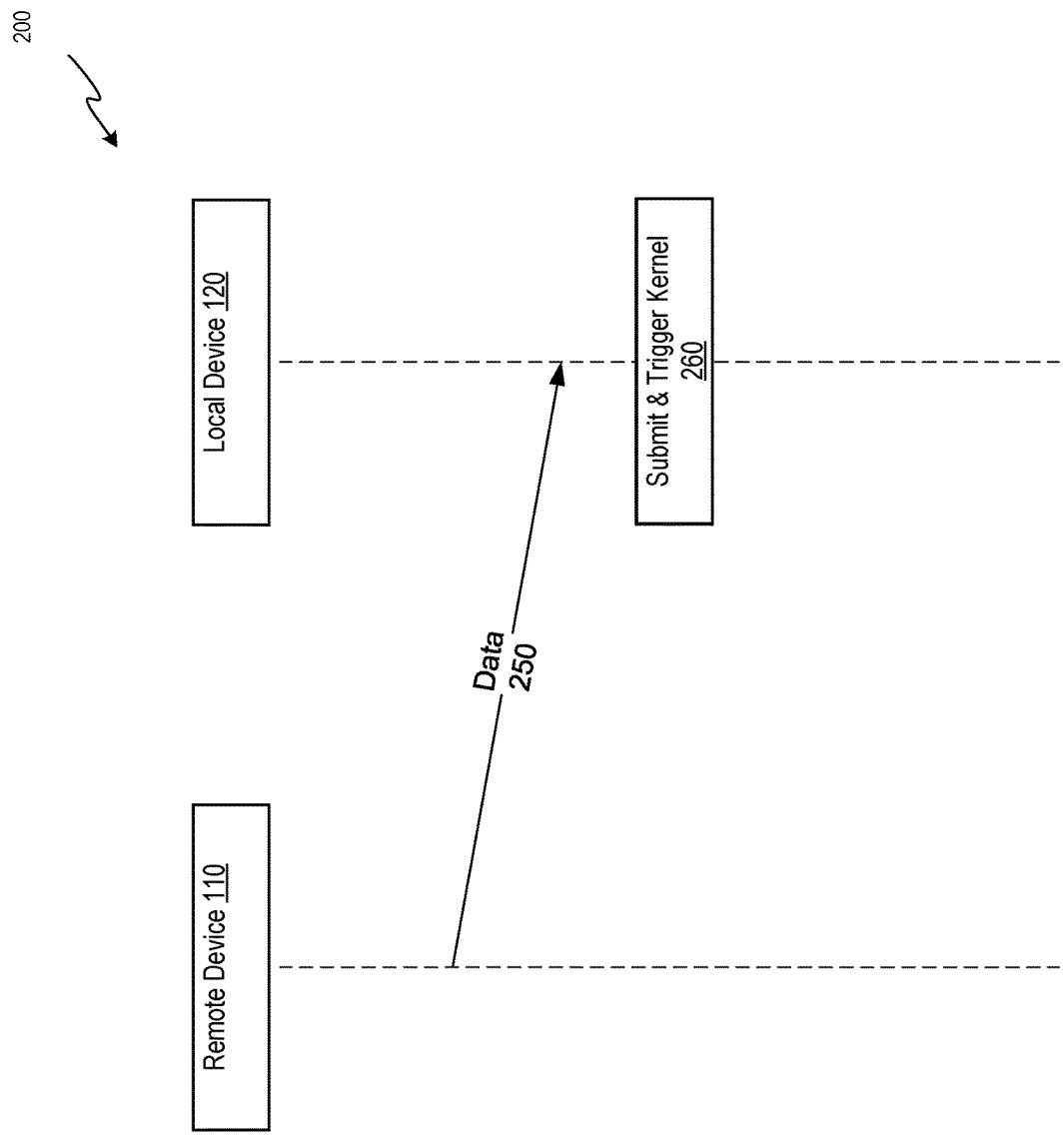
FIG. 2 illustrates another example an example scenario for kernel submission and execution.

FIG. 2 is a sequence diagram illustrating an example scenario for kernel submission and execution in which a kernel is submitted after sufficient information is known about data to be processed. FIG. 2 illustrates a method of launching an optimized kernel on a local device (e.g., on a CPU or GPU of local device 120) based on data received by a local device 120 from a remote device 110. At block 250, remote device 110 sends data to local device 120 (e.g., over a network connection or over a bus such as a peripheral component interconnect (PCI) bus). Once the data is received, local device submits and triggers a kernel for processing the data at block 260. Accordingly, the local device 120 waits for the data prior to submitting the kernel in order to determine an appropriate kernel and/or appropriate kernel properties to launch and submit, at block 260. This approach increases latency in processing the data. The present disclosure provides techniques and methods for an efficient way to launch a kernel and update parameters of the kernel after submission to a processor and prior to execution of the kernel based on data received from a remote source (e.g., over a network). Embodiments reducing latency and overhead associated with scheduling and executing kernels while ensuring that kernels are submitted that have optimal kernel properties.

Figure 3:
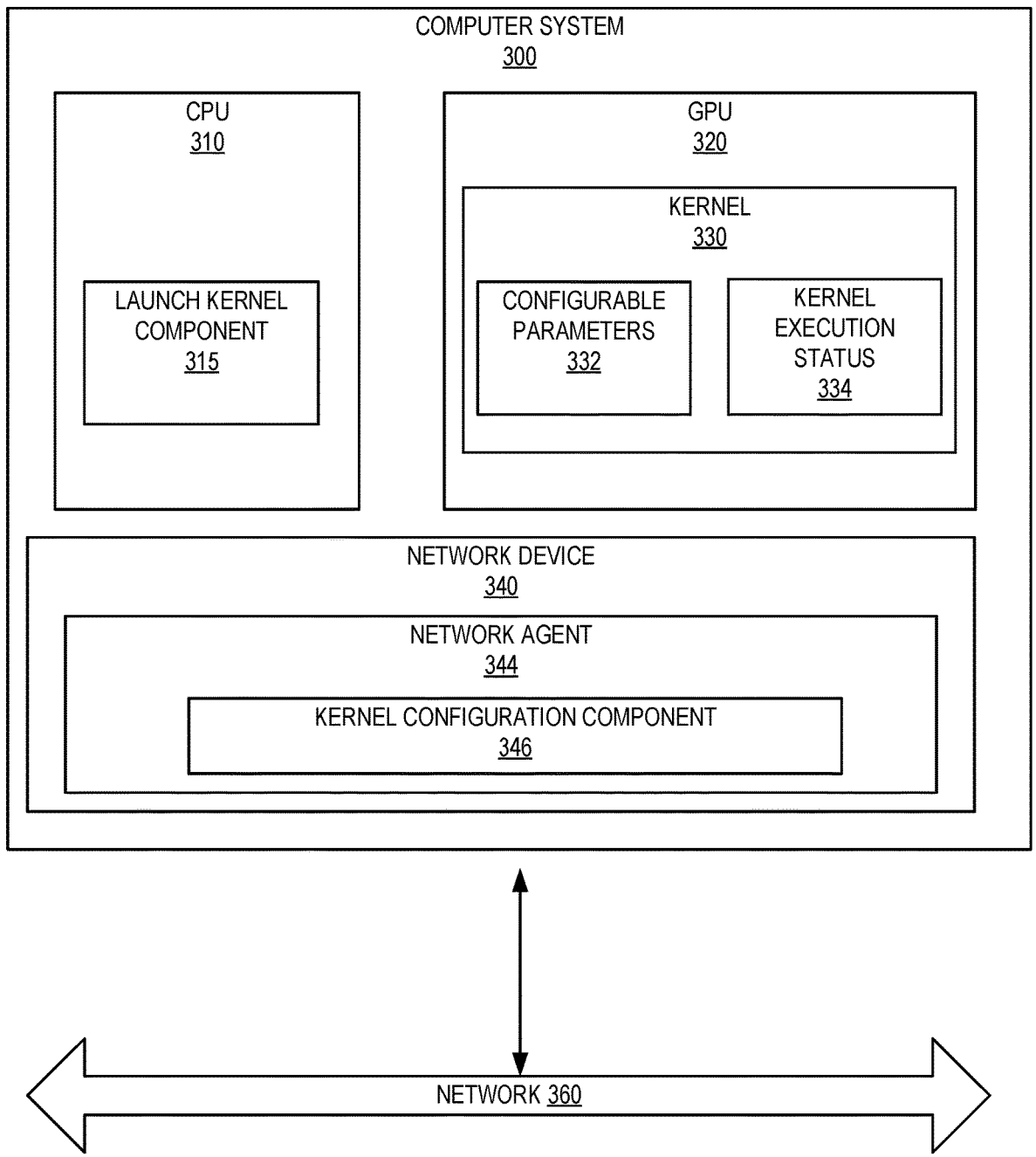
FIG. 3 is a diagram of a computing environment for optimizing a kernel submitted on a graphics processing unit prior to triggering of execution by a network device, in accordance with at least one embodiment.

FIG. 3 illustrates a computer system 300 that includes a CPU 310, a GPU 320, and a network device 340 in accordance with some embodiments of the present disclosure. The CPU 310 can include a launch kernel component 315. The launch kernel component 315 may launch or submit a kernel 330 to be executed on the GPU 320. Alternatively, or additionally, the launch kernel component 315 may launch or submit a kernel 330 to be executed on CPU 310 or on another CPU (not shown). Alternatively, or additionally, the launch kernel component 315 may launch or submit a kernel 330 to be executed on an accelerator other than GPU 320, such as a field programmable gate array (FPGA) of digital signal processor (DSP)). Embodiments are discussed herein with reference to submitting, updating and triggering execution of a kernel on a GPU. However, it should be understood that the same methods, techniques and mechanisms described with reference to submitting, updating and triggering execution of a kernel on a GPU also apply to submitting, updating and triggering execution of a kernel on a CPU (which may be a same or different CPU that submits the kernel, such that a CPU may submit a kernel to itself), an accelerator (e.g., an FPGA), and/or any other processor that can execute a kernel. Thus discussions herein with reference to kernels on GPUs also apply to kernels on other types of processors, such as FPGAs and CPUs.

On submission of the kernel 330, the launch kernel component 315 may indicate that the parameters (e.g., execution configurations) of the kernel 330 will be dynamically configurable (e.g., later optimized). In one embodiment, launch kernel component 315 launches a delayed execution kernel. The delayed execution kernel may be a kernel 330 that includes one or more configurable parameters 332 and a kernel execution status flag 334. The one or more configurable parameters 332 may be at one or more first memory locations in a memory of GPU 320, and the kernel execution status flag 334 may be at a second memory location in the memory of GPU 320. Configurable parameters 332 can include, for example, how many threads to use for the kernel, number of arguments, and message size. Configurable parameters may include, for example, data size, data type, number of threads, and/or amount of memory.

In embodiments, once kernel 330 is submitted to GPU 320, information about the kernel is provided to a network agent 344 of network device 340. Alternatively, or additionally, the information about the kernel may be provided to an agent of another device. In either case, the device should be a device that is on a communication path with a remote device and that will receive incoming data from the remote device that will be processed by the kernel 330. In an example, the agent may be an agent of a device that communicates with another device via a communication bus or other communication mechanism (e.g., by a PCI bus) to receive the data to be processed by the kernel 330. In another example, the agent may be an agent of a silicon photonics module in a processor (e.g., a CPU), which may receive data over a silicon photonics link. Embodiments are discussed with reference to a network agent 344 of a network device 340 that updates kernel 330 and triggers execution of kernel 330. However, it should be understood that the network agent may instead be an agent of any type of device that is in a communication path with a remote device over which data to be processed is received.

In some embodiments, the computer system 300 may include a plurality of network devices (or other types of communication devices), in which case the launch kernel component 315 can further indicate which network device (or other type of communication device) of the plurality of network devices is permitted to dynamically configure parameters of the launched kernel after submission.

As mentioned, the CPU 310 of the computer system 300 can submit the kernel 330 on the GPU 320. The GPU 320 can store the kernel 330 at a memory location on the GPU 320. In some embodiments, the CPU 310 is unaware of the memory location of the kernel 330. Alternatively, the memory location of the kernel 330 in a memory of GPU 320 may be returned to the CPU 310.

The kernel 330 includes dynamically configurable parameters 332 and a kernel execution status 334. As noted above, the dynamically configurable parameters 332 refer to the parameters of the kernel 330 that are to be dynamically configurable. Each of the dynamically configurable parameters may have a location within the memory of GPU 320. Each dynamically configurable parameter may have multiple possible settings, which may be controlled by setting one or more bits at the respective memory locations in the memory of GPU 320. For example, data size, number of threads and/or amount of memory may each be represented as an integer value in memory. Incoming data may have one or more data types, such as Boolean, string, numerical, and so on. Each data type may be associated with a bit value. One possible configurable parameter is kernel type. In one embodiment, each data type has an associated kernel type for processing that type of data.

There may be multiple different types of kernels that an application may execute. At the time of kernel submission, there may be insufficient information to determine which type of kernel is to be used. Accordingly, a kernel type parameter may be set to a default or unknown at the time of kernel submission. Once information about data to be processed is known, then a type of kernel to use may be determined and the kernel type parameter may be set. Each kernel type value may point to a different kernel type for execution.

In some embodiments, there are a finite number of different types of kernels that may be executed at a given time and/or for a given application. In some embodiments, launch kernel component 315 launches a separate delayed execution kernel for each of the kernel types. Then, once information is known about the data to be processed, the appropriate kernel type for processing the incoming data is selected for execution and updated. The other delayed execution kernels may then be ignored or removed from a queue. There is little to no overhead associated with submitting multiple different kernels in this manner because resources are not actually used for running any of the non-selected kernels.

The above technique for pre-submitting multiple kernels each having different kernel parameters may additionally or alternatively be applied to other kernel parameters. For example, multiple delayed execution kernels may be submitted in parallel prior to receipt of data to be processed, where each kernel may have a different number of threads setting and/or a different data size setting. Once information on the data is received and a determination can be made as to the number of threads to be used and/or the data size, then the pre-loaded kernel already having the determined number of threads and/or data size may be used and the other pre-loaded kernels may be dropped or ignored.

In some embodiments, multiple delayed execution kernels may be submitted in parallel, where each of the submitted kernels has a different combination of kernel parameters. Once information on data to be processed is determined, then an appropriate pre-submitted kernel may be determined and used to process the data.

The kernel execution status 334 indicates whether the kernel 330 on the GPU 320 is ready to be executed. The kernel execution status 334 may have a memory location in the memory of GPU 320, which may be returned to CPU 310 on submission of the kernel 330. The kernel execution status 334 may be represented using a flag with one or a few bits, where one bit value (e.g., a 0) indicates that the kernel is in a wait-to-execute state and another bit value (e.g., a 1) indicates that the kernel is in a ready-to-execute state. Initially, on the submission of the kernel 330, the kernel execution status 334 is preset to a wait-to-execute state. While the kernel 330 is in the wait-to-execute state, execution of the kernel on a work queue (e.g., a stream of the GPU 320) is delayed. The kernel 330 may be maintained in the wait-to-execute state until all data necessary to optimize the kernel is received and the configurable parameters 332 of the kernel 330 have been configured. Upon receipt of data from the network device 340 and updating of the configurable parameters 332, the kernel execution status 334 may be updated to ready-to-execute. The kernel 330 may then be executed on the GPU 320.

Launch kernel component 315 may receive information on the memory location (or locations) of the one or more configurable parameters 332. Launch kernel component 315 may send a notification to network agent 344 indicating a kernel that is to be updated for processing of incoming data expected to be received by network device 340. The notification may include memory locations of the configurable parameters 332 as well as a memory location of the execution status flag 334.

The network device 340 can include a network interface controller agent (NIC agent) 344 configured to manage internet communications by examining network packets that are received from network 360. The network packets may include header information and a body. The NIC agent 344 may further include a kernel configuration component 346 that enables the NIC agent 344 to observe the incoming network packets and/or to analyze header information and/or data received from the network 360. NIC agent 344 may identify, from the header information of received messages, data to be processed by kernel 330. The NIC agent 344 can update the configurable parameters 332 on the GPU 320 based on the header information and the memory location of the configurable parameters 332 on the GPU 320. After updating the configurable parameters 332 of the kernel 330, the NIC agent 344 can update the kernel execution status 334 of the kernel 330 to "execute" or "ready-to-execute" once the body of the data has been received. In some embodiments, the header information and the body can be received simultaneously, thereby resulting in updating of the configurable parameters 332 and the update of the kernel execution status 334 to occur in parallel. After the kernel execution status 334 has been updated to execute, the GPU 320 can run an optimized kernel 330.

Multiple technical benefits are achieved by using a configurable kernel that has delayed execution in conjunction with offloading the task of updating the kernel and triggering execution of the kernel to an agent that is in a data path for the data to be processed by the kernel. For example, the kernel can be submitted early (before optimal parameters for the kernel can be determined), reducing a delay in processing data with the kernel while still achieving optimal parameters for the kernel. Additionally, or alternatively, delay associated with ultimately updating the kernel and triggering execution of the kernel can be reduced since there may be no or reduced communications between the NIC and the CPU after the data to be processed is received. Additionally, or alternatively, resources of the CPU may be freed up since the network agent handles updating the kernel and triggering execution of the kernel.

Figure 4:
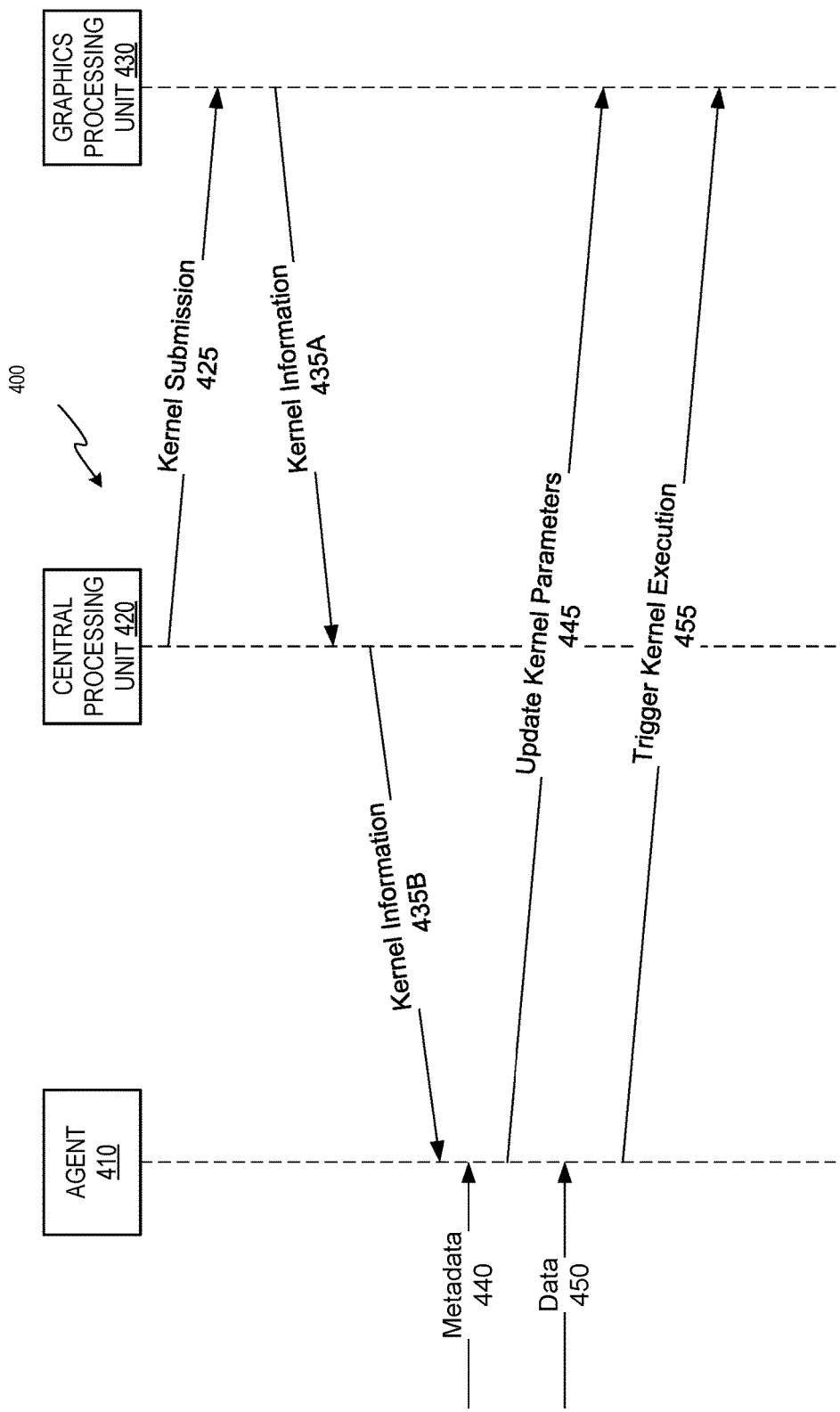
FIG. 4 is a sequence diagram illustrating a method of updating a configurable kernel on an accelerator by an agent, in accordance with embodiments of the present disclosure.

FIG. 4 is a sequence diagram illustrating a method 400 of updating a configurable kernel by an agent, in accordance with embodiments of the present disclosure. Once the computer system 400 is initiated, central processing unit 420 performs kernel submission 425 of a kernel to graphics processing unit 430. The submitted kernel may be a delayed-execution kernel. With reference to FIG. 3, as described previously, the launch kernel component 315 may launch a kernel with dynamically configurable parameters to be submitted to the GPU. Once the kernel is submitted on the graphics processing unit 430, the graphics processing unit 430 sets the kernel execution status (FIG. 3) to wait-to-execute indicating that the graphics processing unit 430 is awaiting arrival of data from the agent 410. It should be noted that in some embodiments the CPU 420 submits the kernel to itself, so that the kernel will ultimately execute on the CPU 420. Alternatively, GPU 430 may be replaced with another type of processor, such as another CPU or an FPGA or other accelerator.

After submission of the kernel, the graphics processing unit 430 provides the CPU 420 with kernel information (block 435A). The kernel information may include an identity of the submitted kernel, one or more memory locations of the kernel, memory locations of one or more configurable parameters of the kernel and/or a memory location of a delayed execution flag (e.g., wait-to-execute flag) of the kernel. CPU 420 may then send the kernel information to an agent 410 (e.g., a network agent of an NIC) at block 435B. Alternatively, the kernel location 435 may be provided directly to the agent 410 by GPU 430. In some embodiments, the kernel information may further include a message signature. In some embodiments, the message signature can include one or more specific criteria for matching incoming data with properties of expected data to be processed by the kernel. In some embodiments, the message signature can include one or more specific criteria for matching incoming data with the appropriate kernel when there are multiple kernels submitted to the graphics processing unit 430. For instance, if there are multiple launched kernels, the message signatures associated with each of the respective kernels may include a number or indicator identifying that kernel. Incoming messages may include a similar number or indicator in their header, which may be used to match incoming data with an appropriate kernel.

The agent 410 can receive metadata 440 from the network, where the metadata 440 is associated with data to be processed by the submitted kernel. The metadata 440 may be included in a message header of a message received by agent 410, where the metadata may include, for example, information on a size of data to be received, a type of data to be received, and so on. Once the metadata 440 is received by the agent 410, the agent 410 can determine appropriate kernel properties for processing the incoming data. For example, based on a data type, agent 410 may determine an appropriate type of kernel to be used. Based on a size of the data, agent 410 may determine an amount of memory to allocate for the data and/or a number of threads to allocate to the kernel. Agent 410 may then perform an update kernel parameters 445 action using the determined kernel parameters and the earlier received memory locations for the kernel parameters.

After the metadata 440 (e.g., message header) is received, data 450 may be received. The data may be, for example, contained in a message body. The data 450 may be received in parallel to the kernel parameters being updated in embodiments. Once the data 450 is received and the kernel parameters have been updated, the agent 410 may perform a trigger kernel execution 455 action by updating a wait-to-execute flag of the kernel from a "wait-to-execute" state to an "execute" or "ready-to-execute" state. Agent 410 may update the wait-to-execute flag based on the previously received memory location for the wait-to-execute flag. The graphics processing unit 430 may then automatically execute the optimized kernel once the kernel execution status has been updated to execute.

Figure 5:
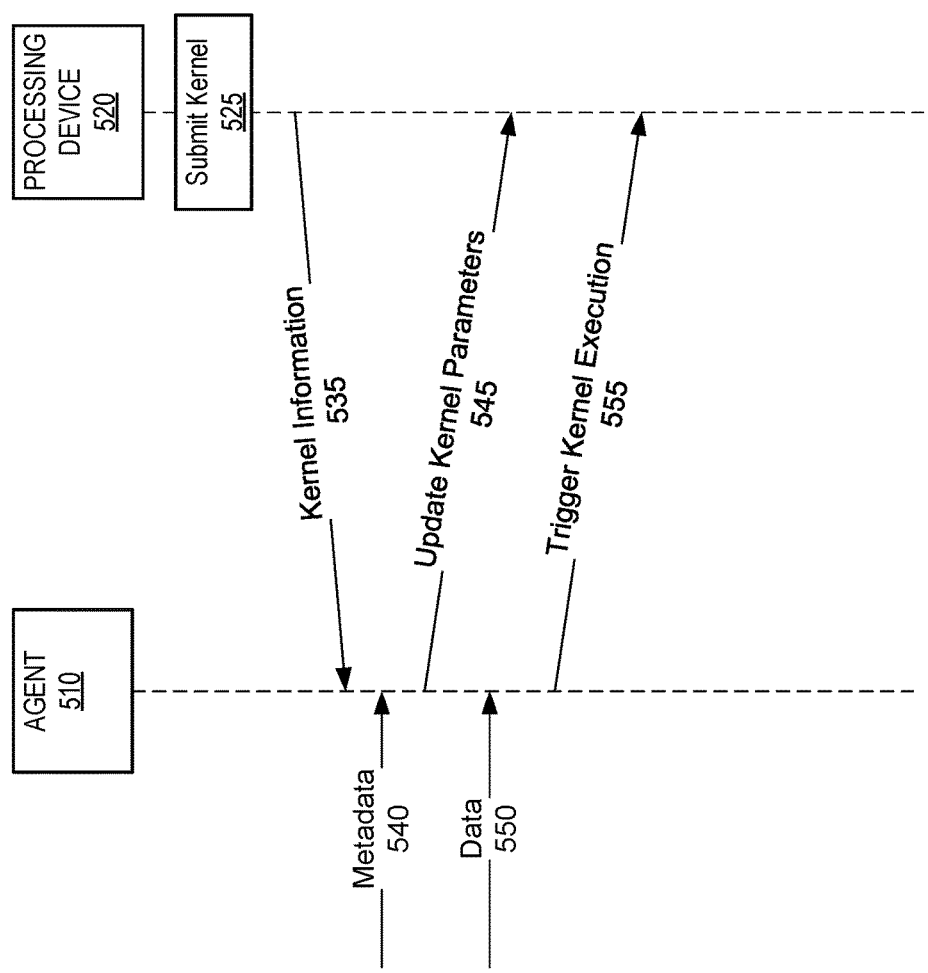
FIG. 5 is a sequence diagram illustrating a method of updating a configurable kernel on a processing device by an agent, in accordance with embodiments of the present disclosure.

FIG. 5 is a sequence diagram illustrating a method 500 of updating a kernel configuration by an agent, in accordance with embodiments of the present disclosure. Once the computer system 500 is initiated, processing device (e.g., a CPU or GPU) 520 performs kernel submission 525 of a kernel to itself. The submitted kernel may be a delayed-execution kernel. With reference to FIG. 3, as described previously, the launch kernel component 315 may launch a kernel with dynamically configurable parameters to be submitted to the CPU. Once the kernel is submitted on the processing device 520, the processing device 520 sets the kernel execution status (FIG. 3) to wait-to-execute indicating that the processing device 520 is awaiting arrival of data from the agent 510.

After submission of the kernel, the processing device provides the agent 510 with kernel information (block 535). The kernel information may include an identity of the submitted kernel, one or more memory locations of the kernel, memory locations of one or more configurable parameters of the kernel and/or a memory location of a delayed execution flag (e.g., wait-to-execute flag) of the kernel. In some embodiments, the kernel information may further include a message signature. In some embodiments, the message signature can include one or more specific criteria for matching incoming data with properties of expected data to be processed by the kernel. In some embodiments, the message signature can include one or more specific criteria for matching incoming data with the appropriate kernel when there are multiple kernels submitted to the processing device 520. For instance, if there are multiple launched kernels, the message signatures associated with each of the respective kernels may include a number or indicator identifying that kernel. Incoming messages may include a similar number or indicator in their header, which may be used to match incoming data with an appropriate kernel.

The agent 510 can receive metadata 540 from the network, where the metadata is associated with data to be processed by the submitted kernel. The metadata may be included in a message header of a message received by agent 510, where the metadata may include, for example, information on a size of data to be received, a type of data to be received, and so on. Once the metadata 540 is received by the agent 510, the agent 510 can determine appropriate kernel properties for processing the incoming data. For example, based on a data type, agent 510 may determine an appropriate type of kernel to be used. Based on a size of the data, agent 510 may determine an amount of memory to allocate for the data and/or a number of threads to allocate to the kernel. Agent 510 may then perform an update kernel parameters 545 action using the determined kernel parameters and the earlier received memory locations for the kernel parameters.

After the metadata 540 (e.g., message header) is received, data 550 may be received. The data may be, for example, contained in a message body. The data 550 may be received in parallel to the kernel parameters being updated in embodiments. Once the data 550 is received and the kernel parameters have been updated, the agent 510 may perform a trigger kernel execution 555 action by updating a wait-to-execute flag of the kernel from a "wait-to-execute" state to an "execute" or "ready-to-execute" state. Agent 510 may update the wait-to-execute flag based on the previously received memory location for the wait-to-execute flag. The processing device 520 may then automatically execute the optimized kernel once the kernel execution status has been updated to execute.

Figure 6:
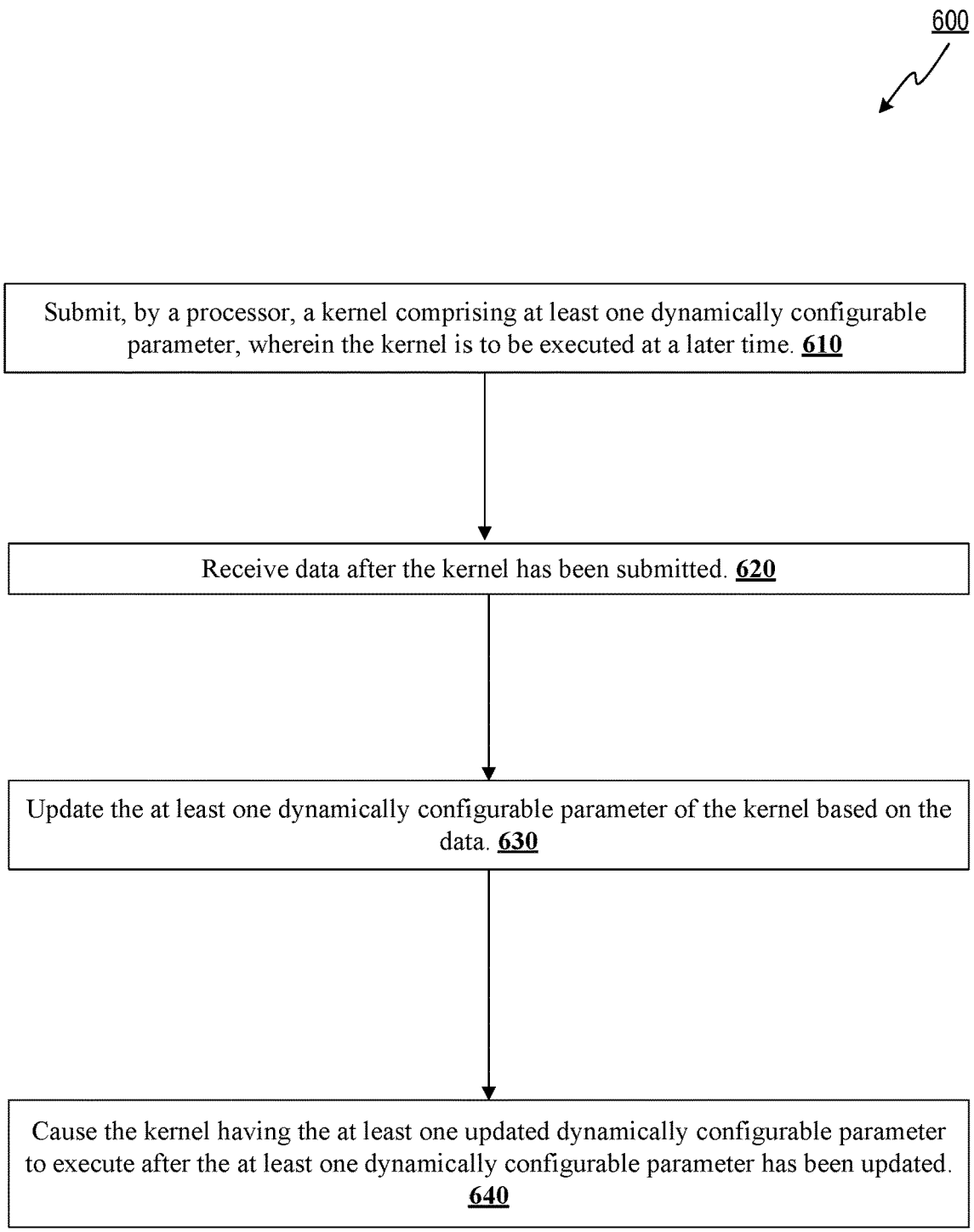
FIG. 6 is a flow diagram of a process of optimizing a kernel submitted on a graphics processing unit prior to execution, in accordance with at least one embodiment.

FIG. 6 depicts a flow diagram of an example method 600 for executing an optimized kernel based on data received from a network or over another communication channel, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 600 may be performed by a network interface controller agent, such as the NIC agent 344 in FIG. 3. Alternatively, some or all of method 600 might be performed by another module or machine. It should be noted that blocks depicted in FIG. 6 could be performed simultaneously or in a different order than that depicted.

At block 610, the processing logic executing on a processor submits a kernel comprising at least one dynamically configurable parameter, wherein the kernel is to be executed at a later time. The kernel may be submitted to, and may execute on, a graphical processing unit, another type of accelerator, or a central processing unit, for example. As described previously, submitting the kernel includes launching the kernel to be executed on the appropriate GPU, CPU, accelerator, etc. When submitting the kernel, the processing logic sets a wait-to-execute flag associated with the kernel. As described previously, an application launches a kernel with dynamically configurable parameters and sets the kernel execution status (FIG. 3) to wait-to-execute indicating that the kernel is awaiting arrival of data. In some embodiments, submission of the kernel may be performed by a network device.

The processing logic executing on the processor receives at least one of a first memory location of the at least one dynamically configurable parameter of the kernel or a second memory location of the wait-to-execute flag (e.g., kernel execution status). In some embodiments, the memory location of the configurable parameter and the kernel execution status are the same. The at least one dynamically configurable parameter may include a data size parameter, a data type parameter, a number of threads parameter, and/or an amount of memory parameter. In some embodiments, the processing logic sends at least one of the first memory location or the second memory location to a network interface controller or other device, wherein the network interface controller (or other device) later receives the data, updates the at least one dynamically configurable parameter of the kernel, and causes the kernel to execute.

At block 620, the processing logic executing on the network interface controller or other device receives data after the kernel has been submitted. The data may be included in a message having a header with header information and a body having message content. The header information may be used to update the at least one dynamically configurable parameter and the body may be used to cause the kernel to execute after the at least one dynamically configurable parameter has been updated. In response to receiving the header information, at block 630, the processing logic executing on the network interface controller or other device updates the at least one dynamically configurable parameter of the kernel based on the data.

At block 640, the processing logic executing on the network interface controller or other device causes the kernel having the at least one updated dynamically configurable parameter to execute after the at least one dynamically configurable parameter has been updated. Causing the kernel to execute may include resetting the wait-to-execute flag associated with the kernel (i.e., setting the kernel execution status to execute).

Figure 7:
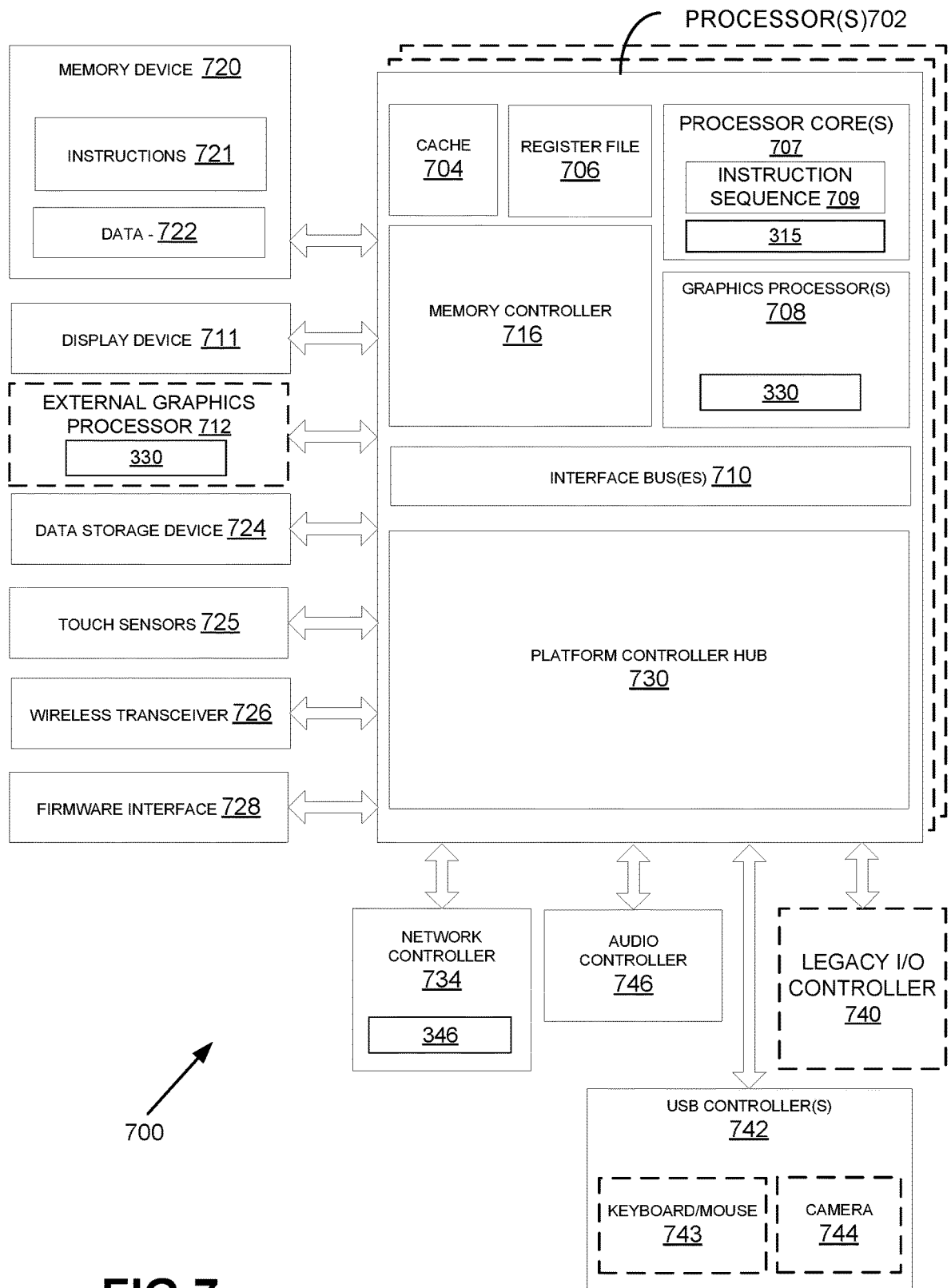
FIG. 7 is a block diagram illustrating a computer system, according to at least one embodiment.

FIG. 7 is a block diagram of a processing system, according to at least one embodiment. In at least one embodiment, system 700 includes one or more processors 702 and one or more graphics processors 708, and may be a single processor desktop system, a multiprocessor workstation system, or a server system having a large number of processors 702 or processor cores 707. In at least one embodiment, system 700 is a processing platform incorporated within a system-on-a-chip (SoC) integrated circuit for use in mobile, handheld, or embedded devices.

In at least one embodiment, system 700 can include, or be incorporated within, a server-based gaming platform, a game console, including a game and media console, a mobile gaming console, a handheld game console, or an online game console. In at least one embodiment, system 700 is a mobile phone, a smart phone, a tablet computing device or a mobile Internet device. In at least one embodiment, processing system 700 can also include, couple with, or be integrated within a wearable device, such as a smart watch wearable device, a smart eyewear device, an augmented reality device, or a virtual reality device. In at least one embodiment, processing system 700 is a television or set top box device having one or more processors 702 and a graphical interface generated by one or more graphics processors 708.

In at least one embodiment, one or more processors 702 each include one or more processor cores 707 to process instructions which, when executed, perform operations for system and user software. In at least one embodiment, each of one or more processor cores 707 is configured to process a specific instruction sequence 709. In at least one embodiment, instruction sequence 709 may facilitate Complex Instruction Set Computing (CISC), Reduced Instruction Set Computing (RISC), or computing via a Very Long Instruction Word (VLIW). In at least one embodiment, processor cores 707 may each process a different instruction sequence 709, which may include instructions to facilitate emulation of other instruction sequences. In at least one embodiment, processor core 707 may also include other processing devices, such a Digital Signal Processor (DSP).

In at least one embodiment, processor 702 includes a cache memory 704. In at least one embodiment, processor 702 can have a single internal cache or multiple levels of internal cache. In at least one embodiment, cache memory is shared among various components of processor 702. In at least one embodiment, processor 702 also uses an external cache (e.g., a Level-3 (L3) cache or Last Level Cache (LLC)) (not shown), which may be shared among processor cores 707 using known cache coherency techniques. In at least one embodiment, a register file 706 is additionally included in processor 702, which may include different types of registers for storing different types of data (e.g., integer registers, floating point registers, status registers, and an instruction pointer register). In at least one embodiment, register file 706 may include general-purpose registers or other registers.

In at least one embodiment, one or more processor(s) 702 are coupled with one or more interface bus(es) 710 to transmit communication signals such as address, data, or control signals between processor 702 and other components in system 700. In at least one embodiment, interface bus 710 can be a processor bus, such as a version of a Direct Media Interface (DMI) bus. In at least one embodiment, interface bus 710 is not limited to a DMI bus, and may include one or more Peripheral Component Interconnect buses (e.g., PCI, PCI Express), memory busses, or other types of interface busses. In at least one embodiment processor(s) 702 include an integrated memory controller 716 and a platform controller hub 730. In at least one embodiment, memory controller 716 facilitates communication between a memory device and other components of system 700, while platform controller hub (PCH) 730 provides connections to I/O devices via a local I/O bus.

In at least one embodiment, a memory device 720 can be a dynamic random access memory (DRAM) device, a static random access memory (SRAM) device, flash memory device, phase-change memory device, or some other memory device having suitable performance to serve as process memory. In at least one embodiment, memory device 720 can operate as system memory for system 700, to store data 722 and instructions 721 for use when one or more processors 702 executes an application or process. In at least one embodiment, memory controller 716 also couples with an optional external graphics processor 712, which may communicate with one or more graphics processors 708 in processors 702 to perform graphics and media operations. In at least one embodiment, a display device 711 can connect to processor(s) 702. In at least one embodiment, display device 711 can include one or more of an internal display device, as in a mobile electronic device or a laptop device, or an external display device attached via a display interface (e.g., DisplayPort, etc.). In at least one embodiment, display device 711 can include a head mounted display (HMD) such as a stereoscopic display device for use in virtual reality (VR) applications or augmented reality (AR) applications.

In at least one embodiment, platform controller hub 730 enables peripherals to connect to memory device 720 and processor 702 via a high-speed I/O bus. In at least one embodiment, I/O peripherals include, but are not limited to, an audio controller 746, a network controller 734, a firmware interface 728, a wireless transceiver 726, touch sensors 725, a data storage device 724 (e.g., hard disk drive, flash memory, etc.). In at least one embodiment, data storage device 724 can connect via a storage interface (e.g., SATA) or via a peripheral bus, such as a Peripheral Component Interconnect bus (e.g., PCI, PCI Express). In at least one embodiment, touch sensors 725 can include touch screen sensors, pressure sensors, or fingerprint sensors. In at least one embodiment, wireless transceiver 726 can be a Wi-Fi transceiver, a Bluetooth transceiver, or a mobile network transceiver such as a 3G, 4G, or Long Term Evolution (LTE) transceiver. In at least one embodiment, firmware interface 728 enables communication with system firmware, and can be, for example, a unified extensible firmware interface (UEFI). In at least one embodiment, network controller 734 can enable a network connection to a wired network. In at least one embodiment, a high-performance network controller (not shown) couples with interface bus 710. In at least one embodiment, audio controller 746 is a multi-channel high definition audio controller. In at least one embodiment, system 700 includes an optional legacy I/O controller 740 for coupling legacy (e.g., Personal System 2 (PS/2)) devices to system 700. In at least one embodiment, platform controller hub 730 can also connect to one or more Universal Serial Bus (USB) controllers 742 connect input devices, such as keyboard and mouse 743 combinations, a camera 744, or other USB input devices.

In at least one embodiment, an instance of memory controller 716 and platform controller hub 730 may be integrated into a discreet external graphics processor, such as external graphics processor 712. In at least one embodiment, platform controller hub 730 and/or memory controller 716 may be external to one or more processor(s) 702. For example, in at least one embodiment, system 700 can include an external memory controller 716 and platform controller hub 730, which may be configured as a memory controller hub and peripheral controller hub within a system chipset that is in communication with processor(s) 702.

Launch kernel component 315 are used to launch kernels with configurable parameters to be submitted and executed on a processing device (e.g., graphics processing unit). Kernel configuration component 346 are used to update the configurable parameters of the kernels launched by the launch kernel component 315. Details regarding launch kernel component 315 and kernel configuration component 346 are provided herein in conjunction with FIG. 3. In at least one embodiment, launch kernel component 315 and kernel configuration component 346 may be used in system 700 for launching kernels with dynamically configurable parameters and updating the dynamically configurable parameters based on data received from the network after submission and prior to execution of the kernel as described herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   submitting, by a processor, a kernel comprising at least one dynamically configurable parameter and a wait-to-execute flag, wherein at least one of a first memory location is assigned to the at least one dynamically configurable parameter of the kernel or a second memory location is assigned to the wait-to-execute flag, and wherein the kernel is to be executed at a later time in view of the wait-to-execute flag;
   receiving data after the kernel has been submitted;
   updating, using the first memory location, the at least one dynamically configurable parameter of the kernel based on the data; and
   causing the kernel having the at least one updated dynamically configurable parameter to execute after the at least one dynamically configurable parameter has been updated.

2. The method of claim 1, wherein submitting the kernel comprises setting the wait-to-execute flag associated with the kernel, the method further comprising:
   receiving, by the processor, the at least one of the first memory location or the second memory location.

3. The method of claim 1, wherein executing the kernel comprises resetting, using the second memory location, the wait-to-execute flag associated with the kernel.

4. The method of claim 1, further comprising:
   sending the at least one of the first memory location or the second memory location to a network interface controller, wherein the network interface controller receives the data, updates the at least one dynamically configurable parameter of the kernel, and causes the kernel to execute.

5. The method of claim 1, wherein the data comprises a message having a header comprising header information and a body comprising message content, wherein the header information is used to update the at least one dynamically configurable parameter and the body is used to cause the kernel to execute after the at least one dynamically configurable parameter has been updated.

6. The method of claim 1, wherein the at least one dynamically configurable parameter comprises at least one of a data size parameter, a data type parameter, a number of threads parameter, or an amount of memory parameter.

7. The method of claim 1, wherein the kernel is submitted to and executes on a graphical processing unit.

8. A system comprising:
a first processing device;
a second processing device, operatively coupled to the first processing device, wherein the second processing device is to submit a kernel comprising at least one dynamically configurable parameter and a wait-to-execute flag to the first processing device for execution at a later time, wherein at least one of a first memory location is assigned to the at least one dynamically configurable parameter of the kernel or a second memory location is assigned to the wait-to-execute flag, and wherein the kernel to be executed at the later time in view of the wait-to-execute flag; and
a third device, operatively coupled to the first processing device and the second processing device, wherein the third device is to:
receive data after the kernel has been submitted;
update, using the at least one of the first memory location, the at least one dynamically configurable parameter of the kernel based on the data; and
cause the kernel having the at least one updated dynamically configurable parameter to execute after the at least one dynamically configurable parameter has been updated.

9. The system of claim 8, wherein the first processing device is a graphical processing unit, the second processing device is a central processing unit, and the third device is a network interface controller, and wherein the network interface controller is to receive the data from a remote system over a network connection.

10. The system of claim 9, wherein the at least one dynamically configurable parameter comprises at least one of a data size parameter, a data type parameter, a number of threads parameter, or an amount of memory parameter.

11. The system of claim 8, wherein submitting, by the second processing device, the kernel comprises setting the wait-to-execute flag associated with the kernel, wherein the third device is to further:
receive the at least one of the first memory location or the second memory location.

12. The system of claim 8, wherein executing the kernel, by the first processing device, comprises resetting, by the third device using the second memory location, the wait-to-execute flag associated with the kernel.

13. The system of claim 8, wherein the first processing device is to further send the at least one of the first memory location or the second memory location to the third device.

14. The system of claim 8, wherein the data comprises a message having a header comprising header information and a body comprising message content, wherein the header information is used to update the at least one dynamically configurable parameter and the body is used to cause the kernel to execute after the at least one dynamically configurable parameter has been updated.

15. A non-transitory computer-readable storage medium comprising instructions that, when executed by a processing device, cause the processing device to perform operations comprising:
submitting, by a processor, a kernel comprising at least one dynamically configurable parameter and a wait-to-execute flag, wherein at least one of a first memory location is assigned to the at least one dynamically configurable parameter of the kernel or a second memory location is assigned to the wait-to-execute flag, and wherein the kernel is to be executed at a later time in view of the wait-to-execute flag;
receiving data after the kernel has been submitted, wherein the data comprises a message having a header comprising header information and a body comprising message content;
updating, using the at least one of the first memory location, the at least one dynamically configurable parameter of the kernel based on the header of the data; and
causing, based on the body of the data, the kernel having the at least one updated dynamically configurable parameter to execute after the at least one dynamically configurable parameter has been updated.

16. The non-transitory computer-readable storage medium of claim 15, wherein submitting the kernel comprises setting the wait-to-execute flag associated with the kernel.

17. The non-transitory computer-readable storage medium of claim 15, wherein the instructions further cause the processing device to perform operations comprising:
receiving the at least one of the first memory location or the second memory location.

18. The non-transitory computer-readable storage medium of claim 15, wherein executing the kernel comprises resetting, using the second memory location, the wait-to-execute flag associated with the kernel.

19. The non-transitory computer-readable storage medium of claim 18,
wherein the kernel is submitted to and executes on a graphical processing unit.

20. The non-transitory computer-readable storage medium of claim 15, wherein the instructions further cause the processing device to perform operations comprising:
sending the at least one of the first memory location or the second memory location to a network interface controller, wherein the network interface controller receives the data, updates the at least one dynamically configurable parameter of the kernel, and causes the kernel to execute.

* * * * *